(12) United States Patent
Henderson

(10) Patent No.: US 11,999,510 B1
(45) Date of Patent: Jun. 4, 2024

(54) SHIPPING AND STORAGE ASSEMBLY FOR AN AIRPLANE AUXILIARY POWER UNIT

(71) Applicant: Jeffrey L. Henderson, Tolleson, AZ (US)

(72) Inventor: Jeffrey L. Henderson, Tolleson, AZ (US)

( * ) Notice: Subject to any disclaimer, the term of this patent is extended or adjusted under 35 U.S.C. 154(b) by 0 days.

(21) Appl. No.: 18/485,232

(22) Filed: Oct. 11, 2023

(51) Int. Cl.
| | | |
|---|---|---|
| *B64F 5/50* | (2017.01) | |
| *B65B 5/04* | (2006.01) | |
| *B65B 23/00* | (2006.01) | |
| *B65B 25/00* | (2006.01) | |
| *B65D 85/68* | (2006.01) | |

(52) U.S. Cl.
CPC ............... *B64F 5/50* (2017.01); *B65B 5/04* (2013.01); *B65B 23/00* (2013.01); *B65B 25/00* (2013.01); *B65D 85/68* (2013.01); *B65D 2585/6877* (2013.01)

(58) Field of Classification Search
CPC ........... B65B 5/04; B65B 23/00; B65B 25/00; B65D 85/68; B65D 2585/6877; B64F 5/50
USPC ............................................. 53/449; 206/319
See application file for complete search history.

(56) References Cited

U.S. PATENT DOCUMENTS

| | | | | |
|---|---|---|---|---|
| 2,300,259 | A | | 10/1942 | Kueppers |
| 2,469,156 | A | * | 5/1949 | Cargill ................... B65D 85/68 206/583 |
| 2,781,991 | A | * | 2/1957 | Walsh ....................... B61C 9/00 248/614 |
| 2,885,165 | A | * | 5/1959 | Smolen .................... F16M 5/00 269/296 |
| 3,675,765 | A | * | 7/1972 | Melsek .................. B65D 85/68 206/319 |
| 4,660,796 | A | * | 4/1987 | Garrec ................... B65D 85/68 414/589 |
| 4,735,310 | A | | 4/1988 | Lemery et al. |
| 4,938,350 | A | * | 7/1990 | Grigsby ................ B65D 85/68 206/319 |
| 4,969,307 | A | * | 11/1990 | Winans et al. ..... B65D 71/0096 53/399 |
| 6,170,141 | B1 | * | 1/2001 | Rossway et al. ......... B64F 5/50 206/319 |
| 9,714,585 | B2 | * | 7/2017 | Morey et al. ......... F01D 25/285 |

(Continued)

FOREIGN PATENT DOCUMENTS

| | | | | | |
|---|---|---|---|---|---|
| GB | | 2526626 A | * | 12/2015 | ............. B65D 85/68 |
| KR | 20130066022 A | * | 6/2013 | ........... B62B 5/0006 |

OTHER PUBLICATIONS

"Commercial_APU_Stands_GSEbay.pdf". pdf file created on Oct. 9, 2023. Copyright 2021.

*Primary Examiner* — Stephen F. Gerrity
(74) *Attorney, Agent, or Firm* — Mark V. Loen

(57) ABSTRACT

A shipping and storage stand for an airplane auxiliary power unit (APU) comprises a support stand assembly that is secured to a rectangular heavy-duty plastic crate. The crate lid is removeable, and the sides can be folded down or removed for APU access. The embodied support stand assembly holds an airplane APU by the designed lift points. The support stand assembly is placed within and bolted to a rectangular crate. The support stand assembly includes an engine cradle frame and shock isolators connected to an anchor frame. The outer crate provides two high stacking. A moisture and dust bag is included for long term storage.

8 Claims, 10 Drawing Sheets

(56) References Cited

U.S. PATENT DOCUMENTS

2017/0023171 A1* 1/2017 Khan .................... B65D 85/68
2019/0106203 A1* 4/2019 Bennett et al. ....... B64C 27/001

* cited by examiner

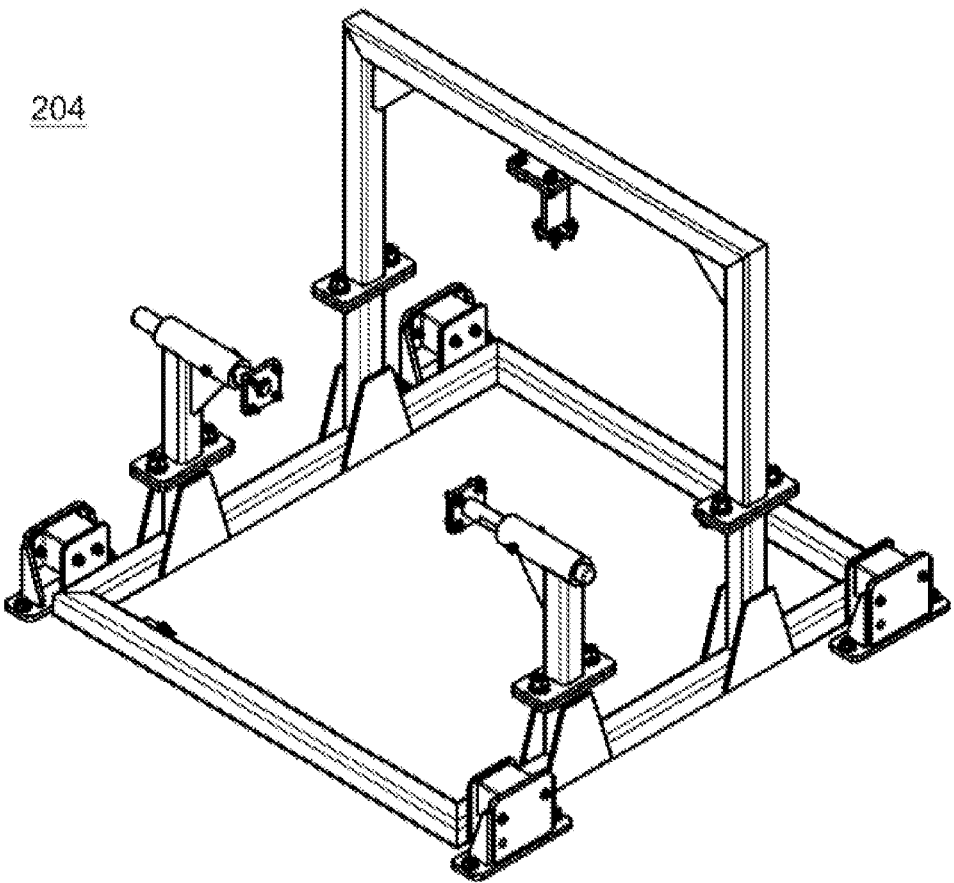
FIG. 4
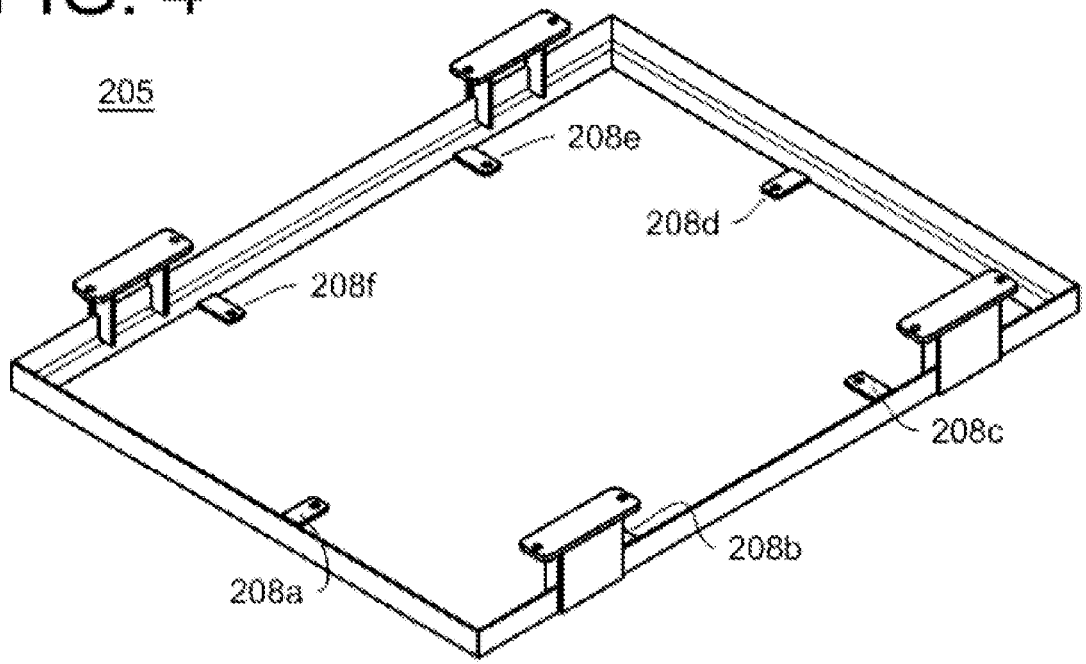

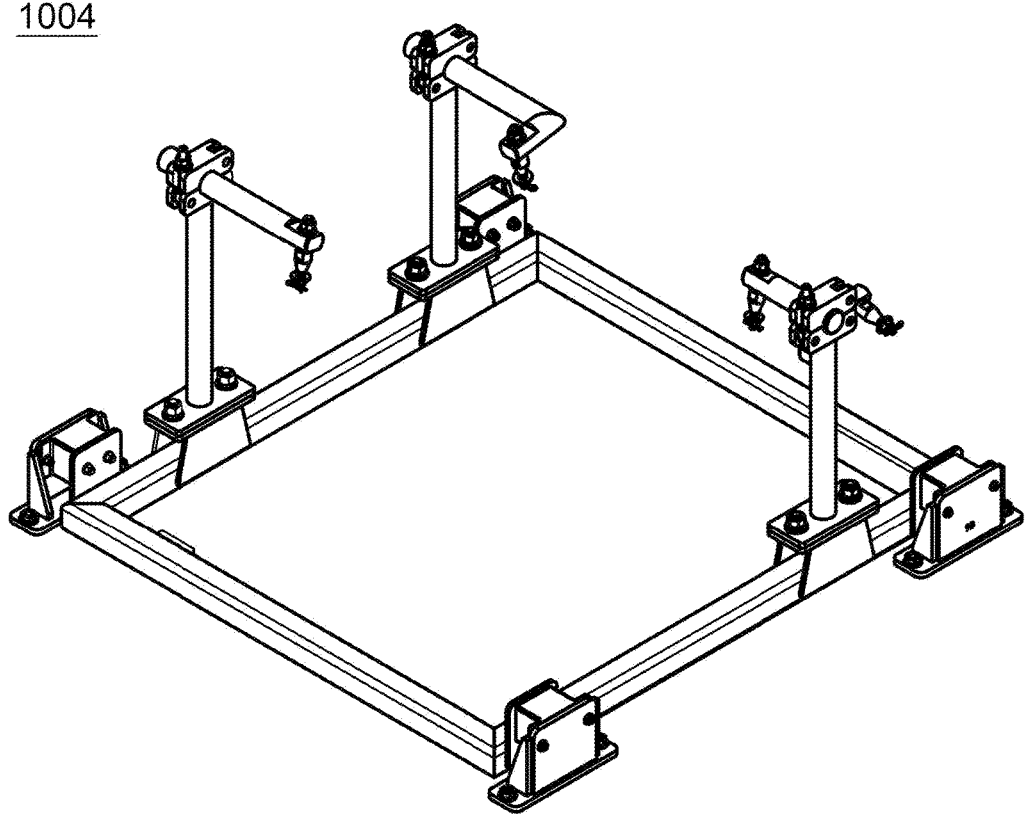
FIG. 10
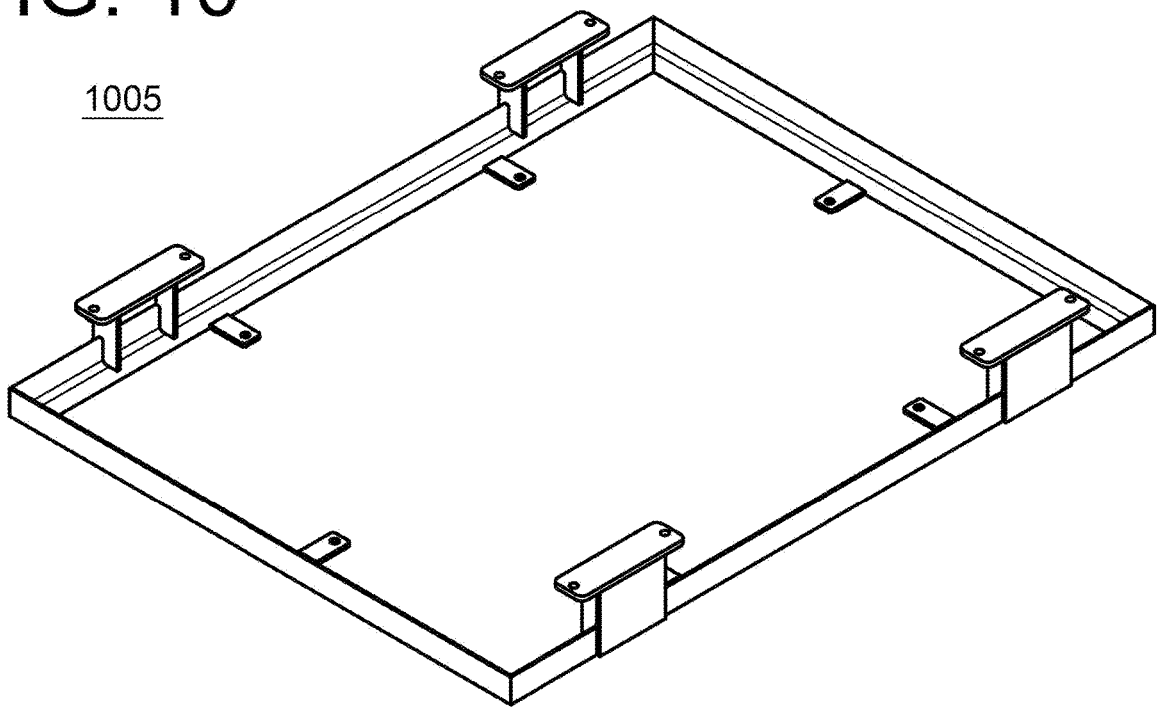

SHIPPING AND STORAGE ASSEMBLY FOR AN AIRPLANE AUXILIARY POWER UNIT

RELATED APPLICATIONS

Not applicable

STATEMENT OF GOVERNMENT INTEREST

Not applicable.

BACKGROUND OF THE INVENTION

(1) Field of the Invention

This invention is directed to improvements in storage of essential airplane equipment. In particular, the storage of auxiliary power units which are installed in an airplane and provide power when the main turbine engines have turned off.

(2) Description of Related Art

Auxiliary power units provide independent power for an airplane when the turbines are off, such as when an airplane is at a gate and the engines are not needed. An example description of auxiliary power units (APU) and their functions is found in U.S. Pat. No. 8,657,227B1. Typically, an APU provides power to one or more of the airplane devices when the engines are not operating and to supplement power during flight. Typically, an APU utilizes airplane fuel and provides power by operating an independent small turbine engine.

Storage stands are needed for auxiliary power units. APU's cannot be simply placed on flat a wooden skid during repair. To prevent damage, they must be held by the designed connection points, and must include a method for stacking. Someway to protect against dust and condensation is preferred. A structure for holding the APU must consider safely and securely holding an APU is necessary for storage.

Current art practice is to primarily use a wood crate, with a wood frame that supports the APU. The wood is easily damaged by any frequent forklift movement, and the life is typically two or three uses. Though these designs are simple, the design lacks long term thinking, and the frequent creation or repair of frames by carpenters is not sustainable.

It is important that a storage assembly for an APU is properly designed to avoid forklift damage. It is also important for an APU unit is free of dust and moisture corrosion when long term storage is required.

SUMMARY OF THE INVENTION

A shipping and storage stand for an airplane auxiliary power unit (APU) comprises a support stand assembly that is secured to a rectangular heavy-duty plastic crate. The crate lid is removeable, and the sides can be folded down or removed for APU access. The embodied support stand assembly holds an airplane APU by the designed lift points. The support stand assembly is placed within and bolted to a rectangular crate. The support stand assembly includes an engine cradle frame and shock isolators connected to an anchor frame. The outer crate provides two high stacking. A moisture and dust bag is included for long term storage.

BRIEF DESCRIPTION OF FIGURES

FIG. 4 demonstrates how the APU support frame splits apart, which simplifies certain APU maintenance procedures.

FIG. 10 shows and exploded view of FIG. 9.

DETAILED DESCRIPTION OF THE INVENTION

The APU Shipping Stand is designed to transport and store a variety of Auxiliary Power Units (APU). It can ship the APU via air-ride truck, or on various freighter aircraft. The size is about 6 ft long, 4 ft wide, and 4-½ ft in height. The total combined weight for the combination of the metal support frame, outer container, and APU is a little over 900 lbs.

The stand is fabricated from structural steel forms conforming to ASTM A500 and A36 materials. All bolted connections use Grade 8 zinc plated or stainless-steel hardware. Stands are primed with one coat of high build epoxy mastic and painted with a two-part polyurethane paint.

The outer frame container is fork liftable from all four sides. The frame container lid is connected to the frame container by four weather resistant draw latches.

The engine cradle is designed to hold the APU securely and safely for transport. The cradle includes mounts to secure the APU for transportation and maintenance.

Figure 1:
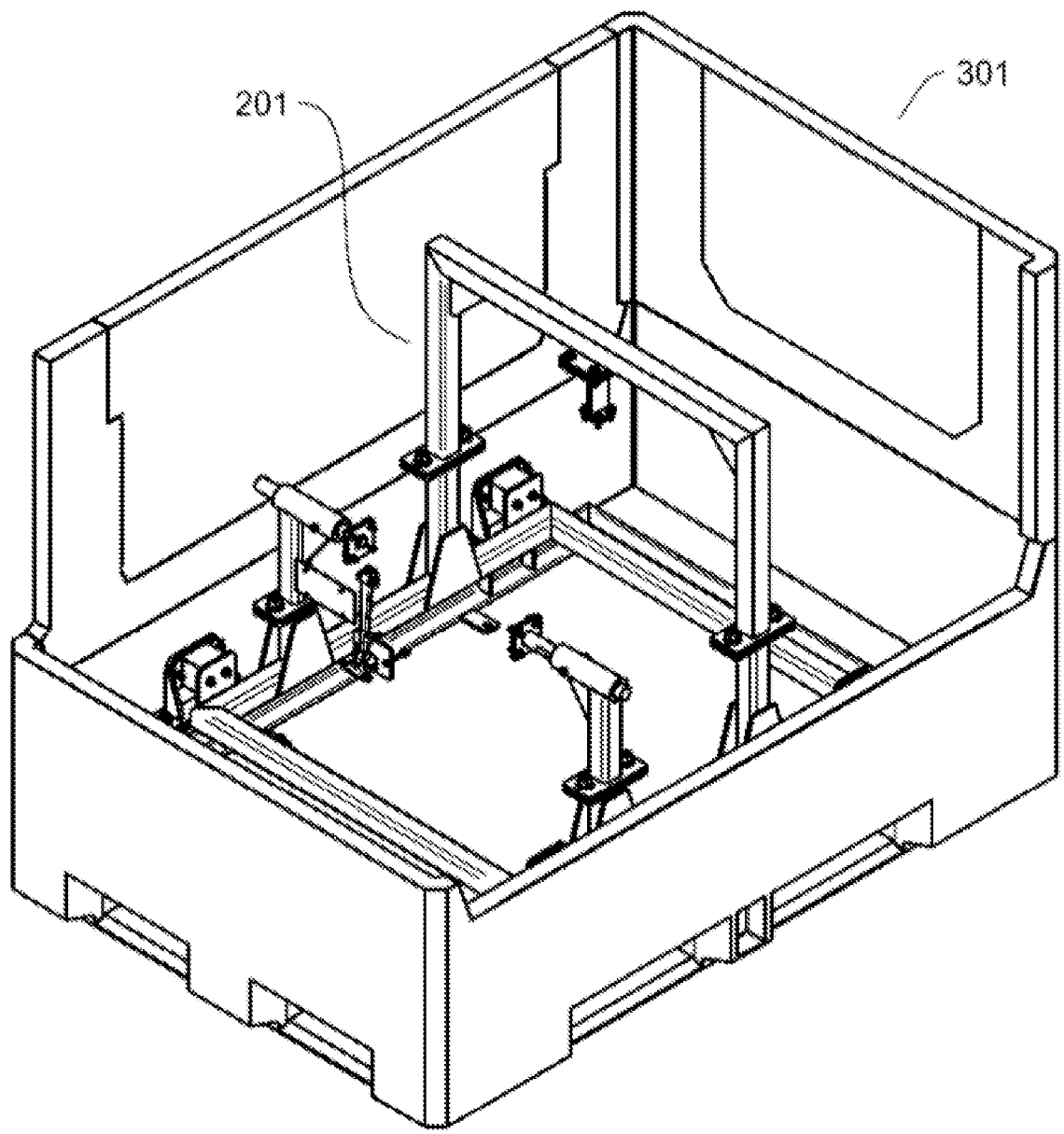
FIG. 1 shows an APU support frame anchored inside an outer protective container.

FIG. 1 shows an APU support frame 201 that is anchored to a rectangular shaped frame container 301. The top and two sides are removed for visibility.

Figure 2:
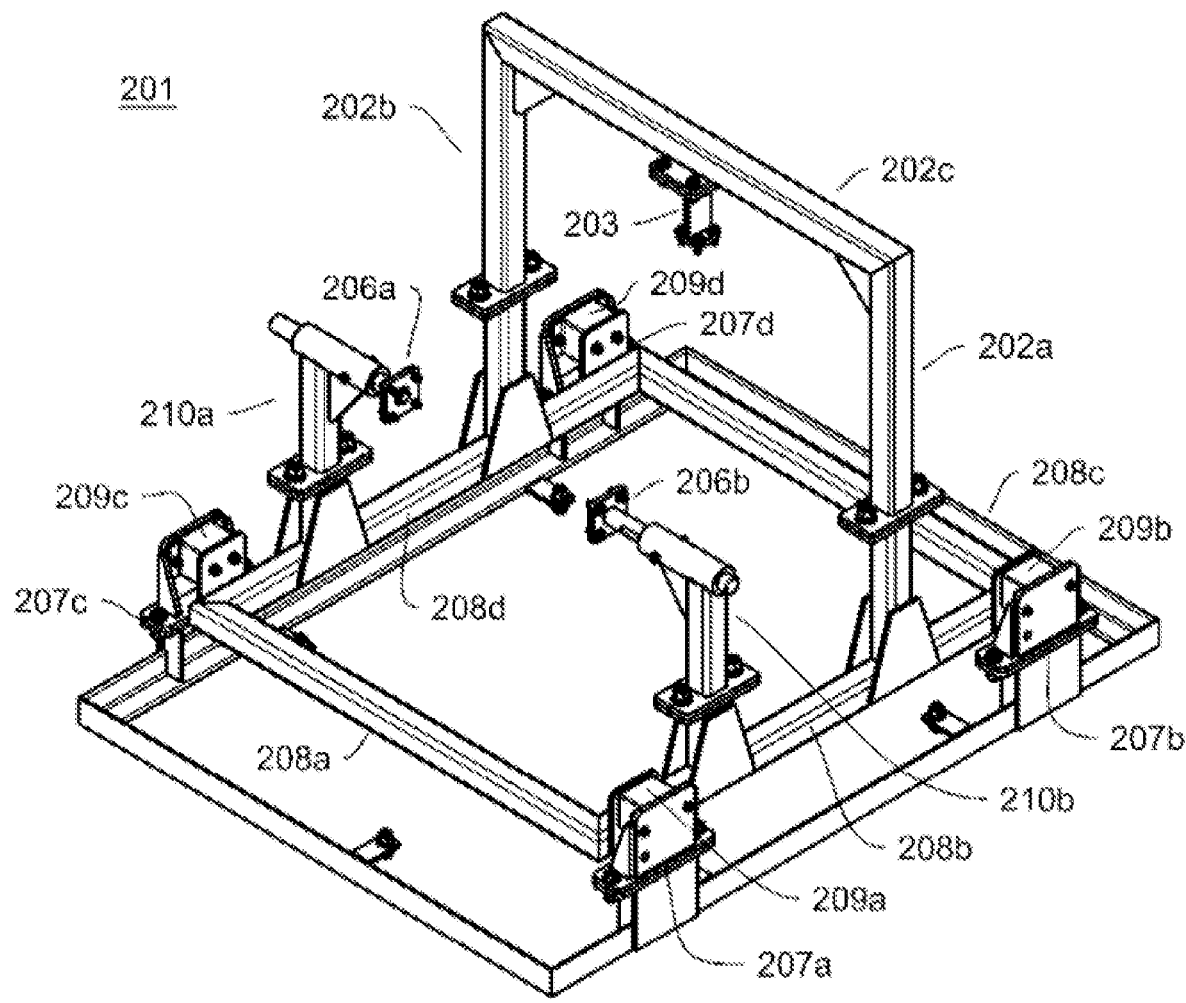
FIG. 2 shows the embodied APU support stand assembly frame connected to an anchor frame.

FIG. 2 shows the embodied APU support frame 201 in more detail. The engine cradle frame 204 (see FIG. 4) includes a yoke assembly with two vertical support members 202a,b and a horizontal support 202c. Aft attaching hardware 203 in the yoke assembly is positioned to line up with an APU lift point. The engine cradle frame includes a cradle base frame made from horizontal supports 208a,b,c,d, connected to four shock isolators 209a,b,c,d that additionally provide a split flange 207a,b,c,b between the cradle base frame and an anchor frame 205 (See FIG. 4).

There are two forward support assemblies 210a,b that are designed to provide a sliding hardware connection 206a,b which provides adjustability in the connection position. See FIG. 8 for more details.

Figure 3:
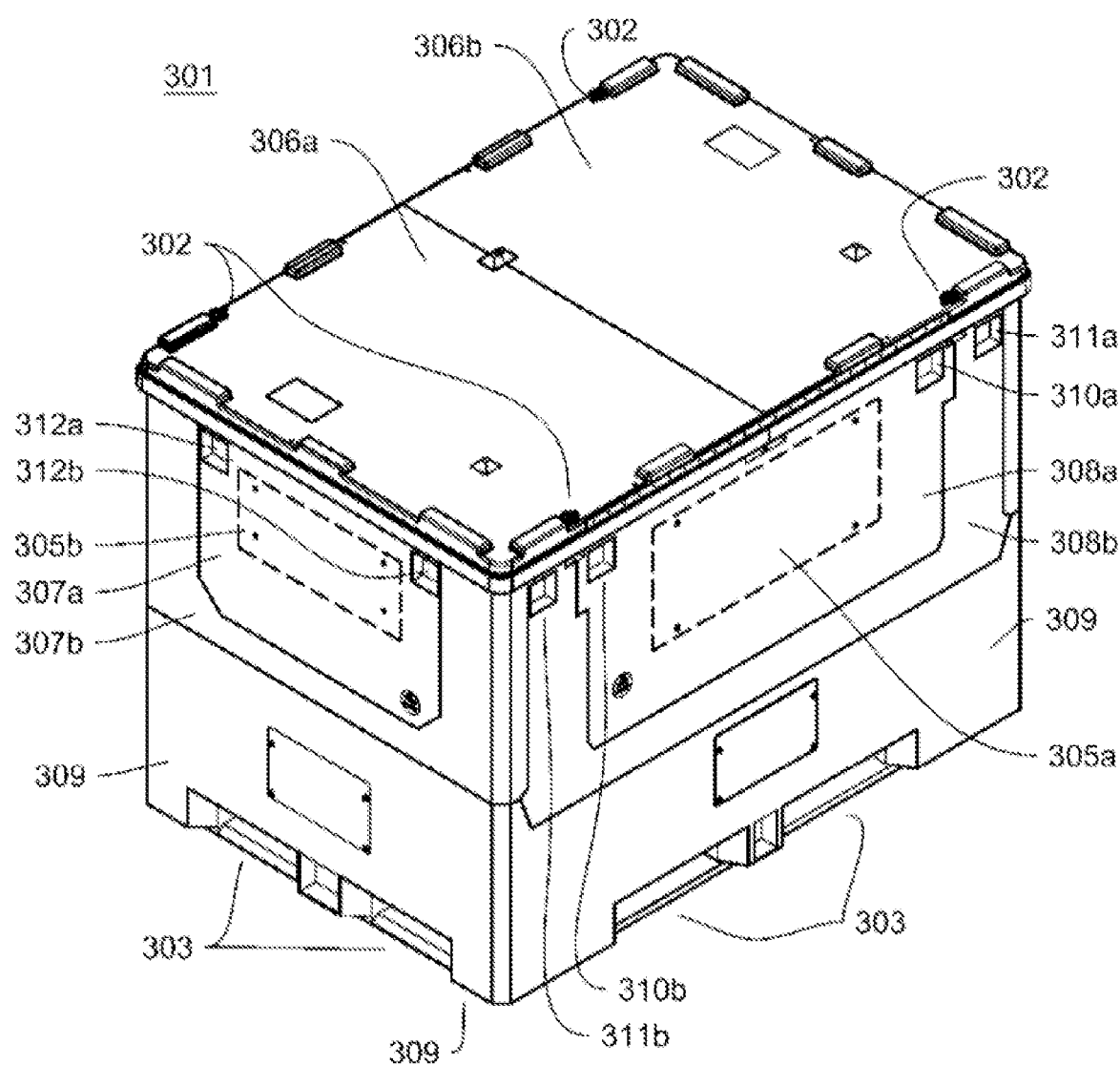
FIG. 3 shows a protective storage frame container for the APU support frame.

FIG. 3 shows the frame container 301 housing both the cradle frame and the APU unit for storage, transportation, and maintenance. Four pins with pull rings 302 connect the two lid panels 306a,b to the front and back panel assemblies. The front and back panel assemblies each have a folding panel frame 308a and a folding U frame panel 308b. The folding panel 308a includes a hinge (not shown) on the lowest edge that allows the folding panel to lay flat against the U frame panel 308b. The folding panel includes spring latches 310a,b which secure the position of the folding panel to the U frame panel 308b. The U frame panel is connected to the base frame 309 by a similar hinge (not shown) and is secured to the end U frames 307a,b by spring latches 311a,b.

The two end panel assemblies each have a folding panel frame 307a and a U frame panel 307b. The folding panel 307a also has a lower edge hinge, and is secured to the U frame panel 307b by spring latches 312a,b. The U frame panel 307b is connected to the base frame 309 by insert tabs. Preferably, the panels with a hinge fold outwardly for maintenance on the APU.

The panel assemblies securely fit under the lid which is made from two firmly connected panels 306a,b. Information labels 305a,b are included for storage, inventory, and tracking purposes.

The container base frame 309 includes Forklift openings 303 which are located on the ends and sides of the container. Preferably, the containers are stackable, at least two high, but this is not a strict requirement.

Preferably, the frame container is made from a strong and affordable plastic such as a high density polyethylene. Preferably, the container incorporates ribbing to provide a stronger frame.

FIG. 4 shows both the engine cradle frame 204 and the rectangular anchor frame 205 separated apart. The anchor frame includes anchor plates 208a,b,c,d,e,f that facilitate connecting the rectangular anchor frame 205 to the crate frame 309. Preferably the connection utilizes bolts. The rectangular crate is designed so that every side is in the shape of a square or rectangle.

Figure 5:
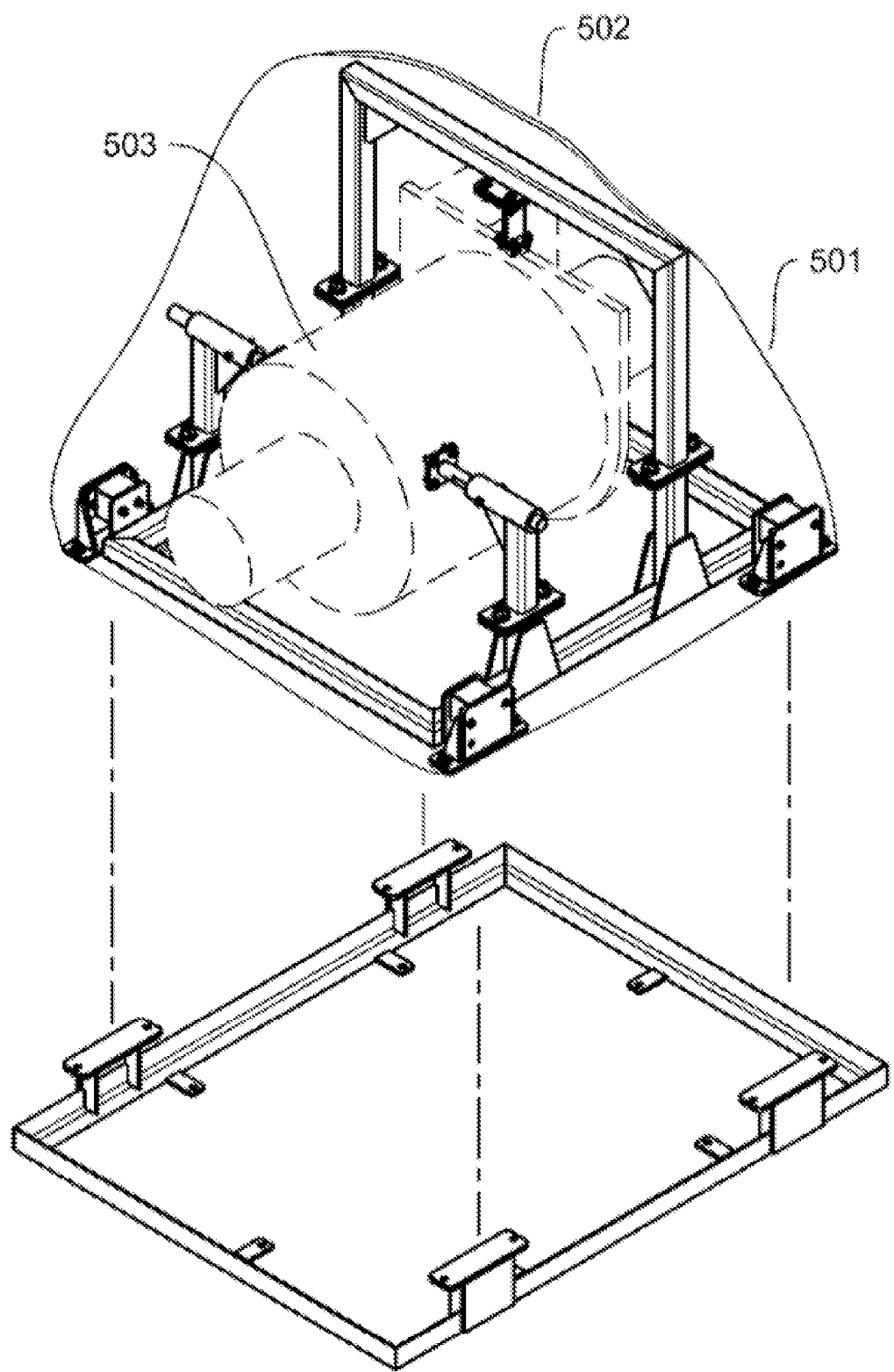
FIG. 5 shows how the split support frame provides convenient installation of a moisture—dust bag.

FIG. 5 shows the engine cradle frame supporting a generic outline of an APU 503 in broken lines. A water and dust proof bag 501 with a seal 502 surrounds the engine cradle frame and the APU to protect the APU from moisture and dust. After bagging, the sealed APU and engine cradle frame are lowered onto the base frame and connected at the split flanges. See FIG. 6. Preferably, desiccant bags are placed inside the sealed bag. Sealing the APU unit from dust and moisture provides enhanced storage life.

Figure 6:
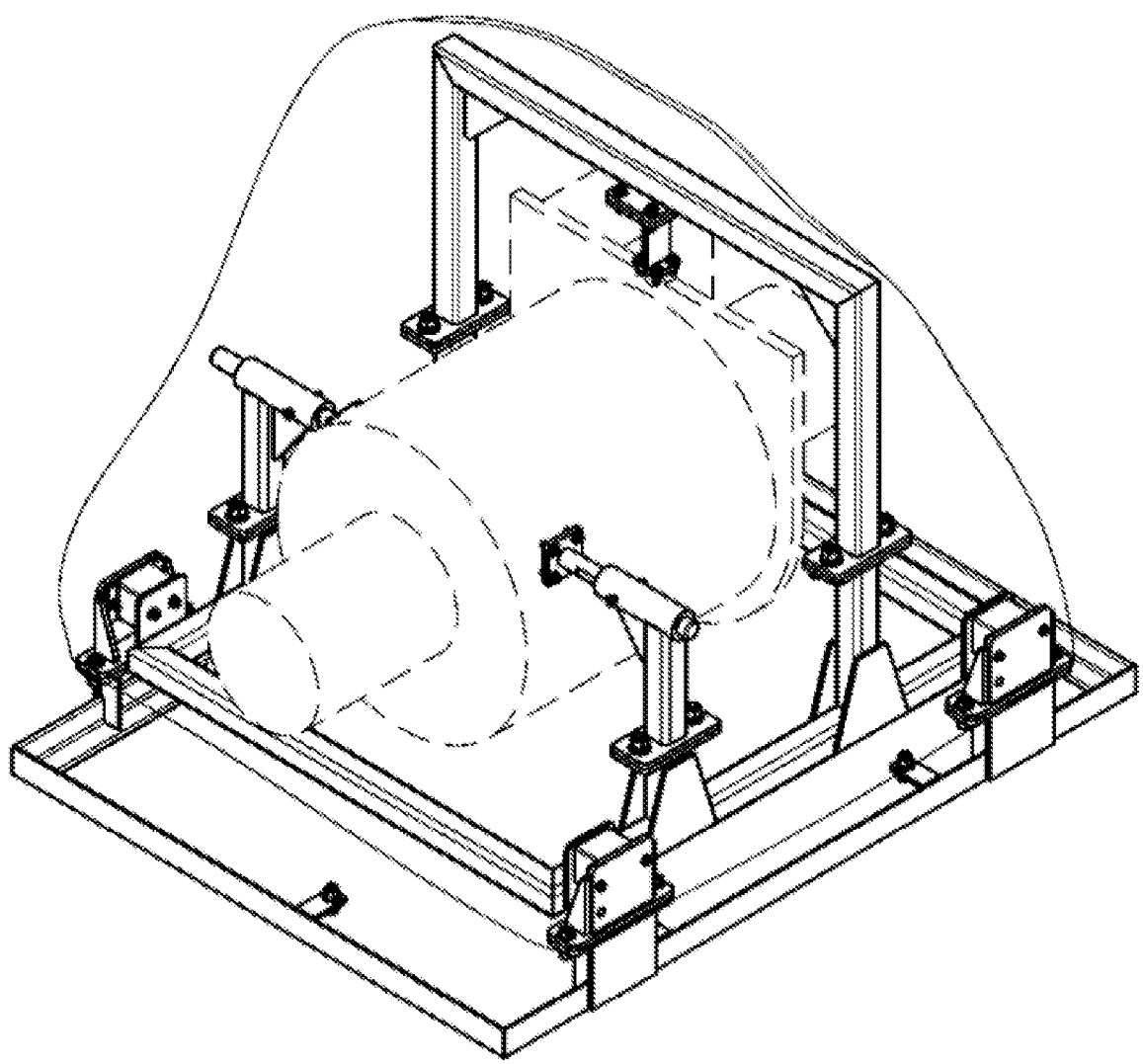
FIG. 6 shows the embodied APU support frame holding a generic APU unit.

FIG. 6 shows the APU in a sealed bag ready to go into the container. The APU has two forward lifting points that are connected to the forward mount assemblies and an aft lifting point that is connected to the yoke.

Figure 7:
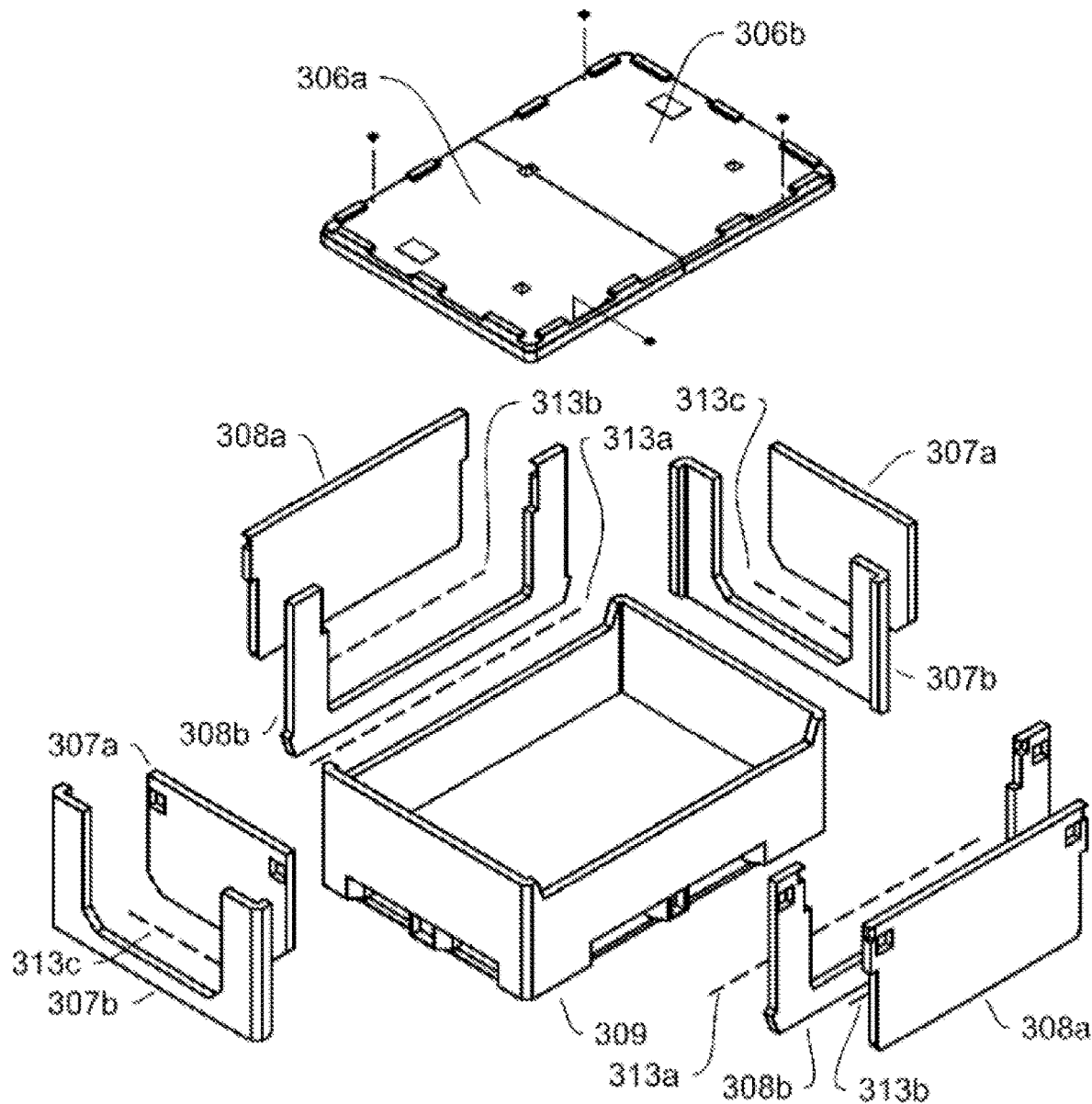
FIG. 7 is an exploded view of the FIG. 3 container.

FIG. 7 shows the container in an exploded view. Hinges 313a,b,c are shown in this view.

Figure 8:
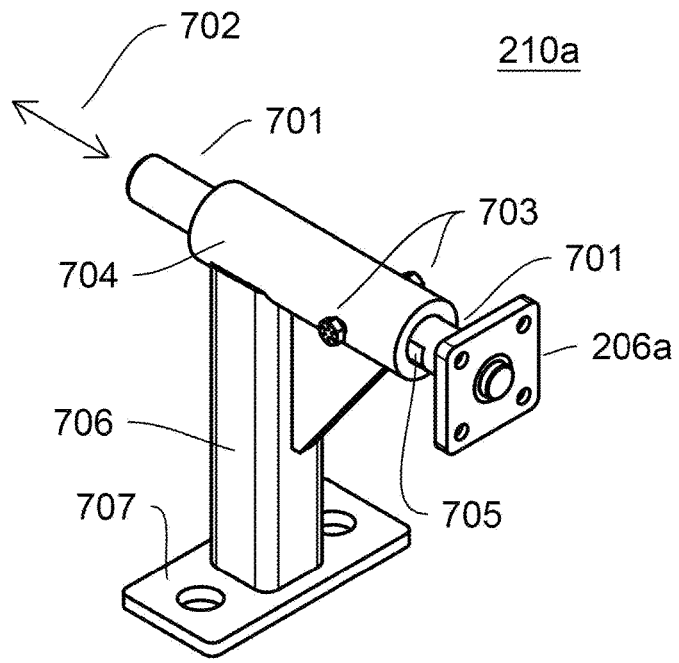
FIG. 8 shows details of the forward APU connector.

FIG. 8 shows the forward APU connection assembly 210a. The sliding shaft 701 has a horizontal sliding direction 702 inside the shaft cylindrical housing 704. Two shaft locking bolts 703 are used to firmly lock the position of the shaft. The shaft has two bolt clamping areas 705 (only one shown) that engage with the locking bolts. The cylindrical housing is connected to a vertical structural support 706 that is connected to a base plate 707 and optionally includes a vertical adjustment mechanism (not shown). The lifting hardware 206a can be of a variety of types, depending upon the APU lift point design.

Typical lift point connections for any APU lift point includes threaded holes, unthreaded holes, hooks, pins, slots, flanges, male/female connectors, and the like.

The second IPU connection assembly 210b is a mirror image.

Figure 9:
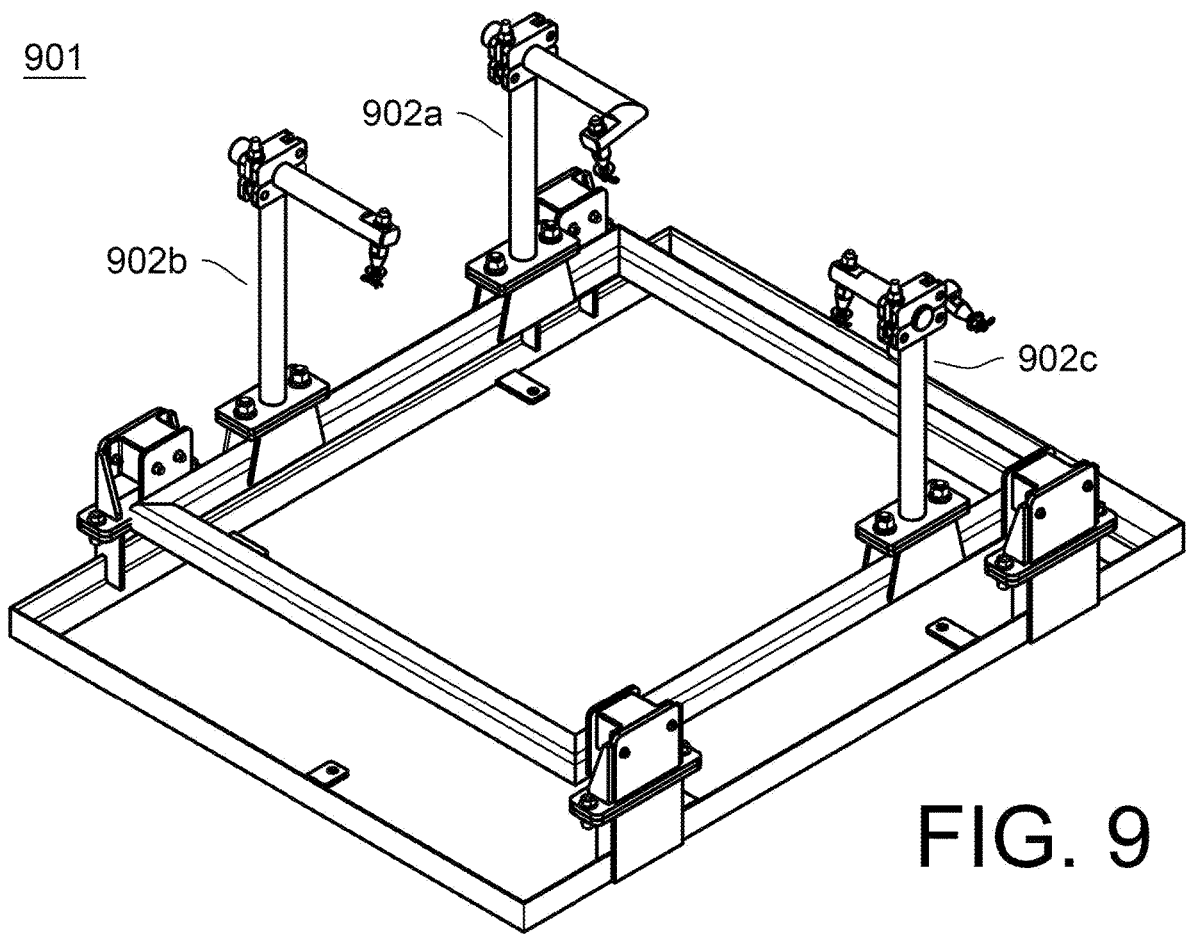
FIG. 9 shows an alternate method of supporting APU lifting points.

FIGS. 9 and 10 show an alternate embodiment of an APU support frame 901 that is very similar to FIG. 2. The engine cradle base frame 1004 (see FIG. 10) includes three support assemblies 902a,b,c that are further detailed in FIG. 11. Attaching hardware is positioned to line up with APU lift points. The engine cradle base frame 1004 is connected to 1005 anchor frame in a manner similar to FIG. 2, by using four shock isolators with split flanges between the cradle base frame 1004 and the anchor frame 1005.

Figure 11:
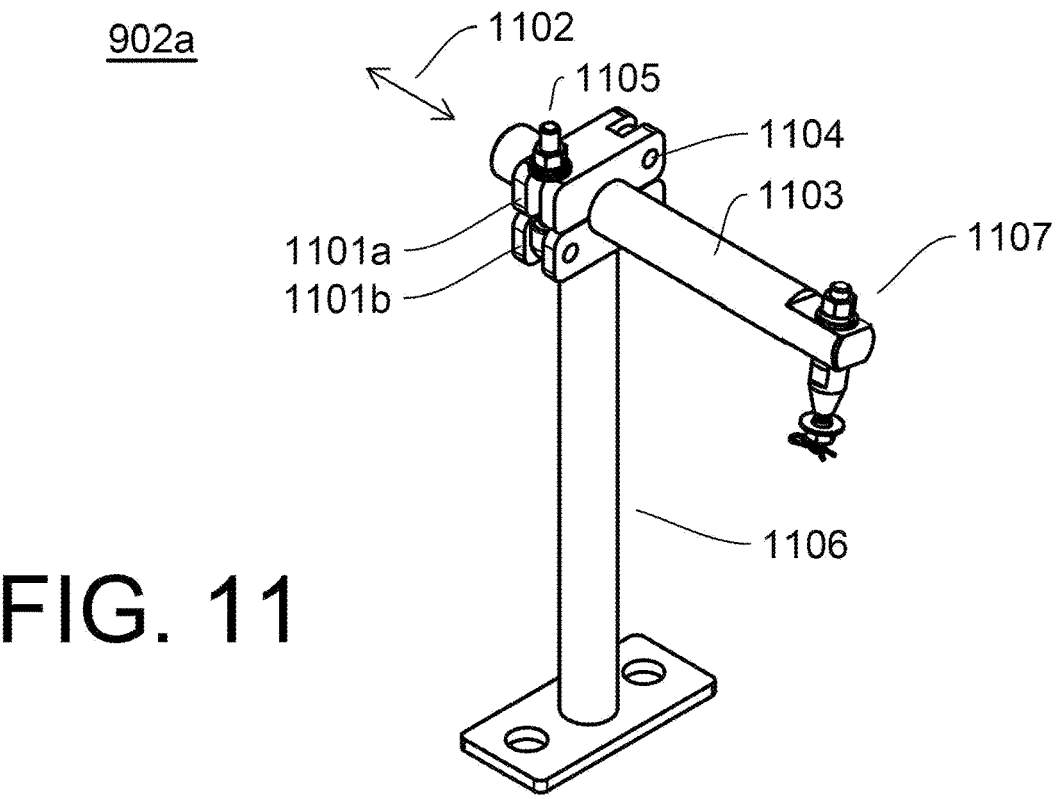
FIG. 11 shows details of an additional support assembly.

FIG. 11 shows details of a lifting point assembly 902a utilizing a vertical structural support 1106 that is connected to a clamp 1101a,b. A horizontal support shaft 1103 is held in place by a clamp 1101a,b which uses a pin 1104 and a clamping bolt 1105. The clamp is arranged to allow the horizontal position of the support shaft to move horizontally 1102 as indicated, to facilitate easy connection to an APU lift point.

The support arms in FIG. 11 can also include another horizontal member to better position attaching hardware 1107 to a lifting point in some cases. The two other supports 902b,c of FIG. 9 show the minor change to the support arm needed to readily connect to an APU lift point.

A preferred method of utilizing the APU support frame of FIG. 9 is to remove the support arms 1103 of the horizontal support assembly and pre-attach them to the APU lifting points. The APU is then carried to the APU support frame, and the arms are positioned in the clamps 1101a,b. A manual/power tool is used to turn the nut on the clamping bolt which simplifies a secure connection without undue stress on the APU lifting points.

Figure 12:
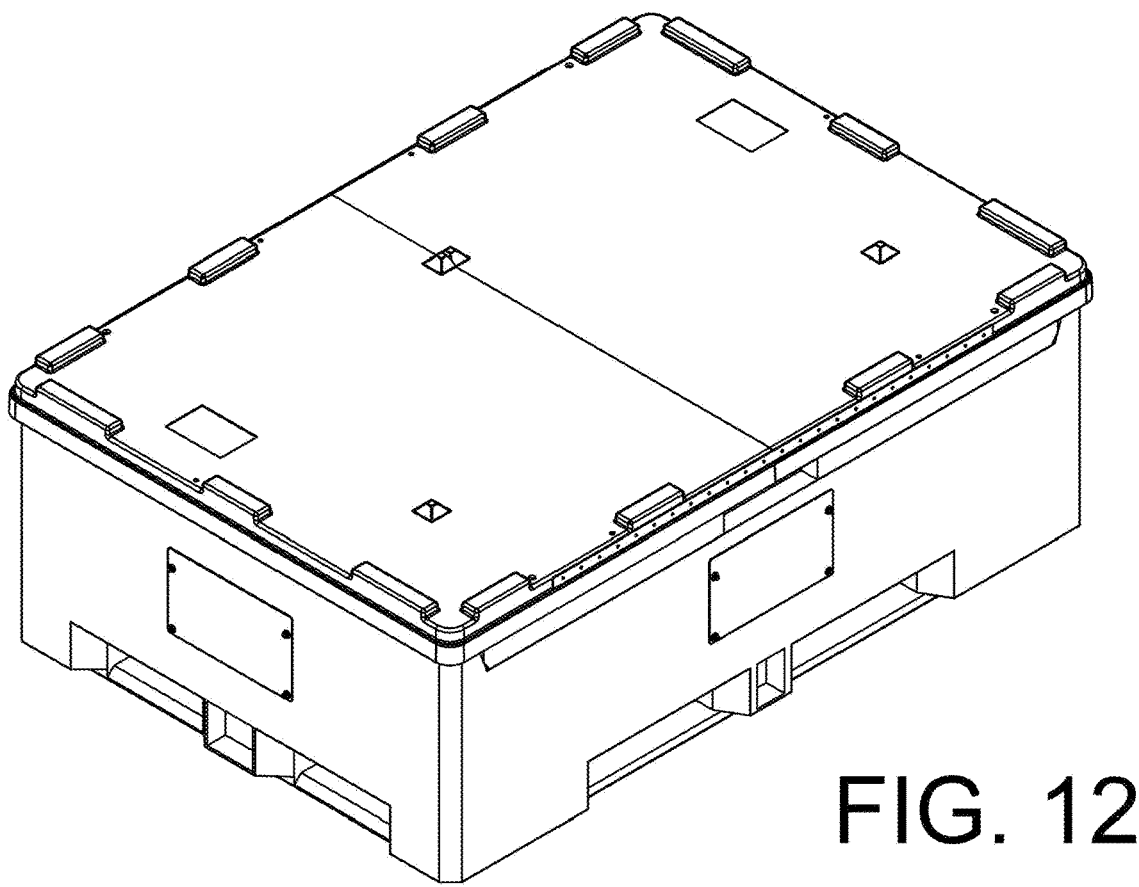
FIG. 12 shows the container parts repositioned for compact shipping.

FIG. 12 shows the shipping crate in a compact form without an APU. This allows for easy transport of the crate when needed in another location.

When stored in a warehouse, the container frames stack on top of each other to a height of two containers. The sides, ends, and lid are removable, so maintenance on the APU is simplified by the base frame being anchored to the container base frame. This provides convenient factory floor positioning by using a fork lift.

The shipping and storage stand is designed for long life. Since it is primarily structural, the only items that need to be maintained are the shock isolators 209a,b,c,d.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

The invention claimed is:

1. A shipping support apparatus for an airplane auxiliary power unit (APU) having three lifting points comprising:
   A) a support stand assembly comprising:
      a) a rectangular shaped cradle base frame,
      b) three lifting point assemblies connected to said cradle base frame,
      c) each of said three lifting point assemblies is an assembly selection from the group consisting of:
         i) a yoke assembly, said yoke assembly further comprising:
            a horizontal member connected to two vertical members,
            said vertical members connected to said cradle base frame,
            attaching hardware connected to said horizontal member, and
            said attaching hardware positioned and configured to connect to one of said lifting points, and
         ii) a horizontal support assembly, said horizontal support assembly further comprising:
            a vertical structural support attached to said cradle base frame, a shaft clamp attached to said vertical structural support,
a sliding shaft positioned inside said shaft clamp,
attaching hardware connected to an end of said sliding shaft,
at least one locking bolt configured and positioned on said shaft clamp to prevent movement of said sliding shaft, and
said attaching hardware positioned and configured to connect to one of said lifting points,
B) a rectangular anchor frame connected to said cradle base frame by a plurality of shock isolators,
C) said rectangular anchor frame having a plurality of anchor plates,
D) a rectangular crate, said anchor plates positioned to connect to said rectangular crate,
E) said support stand assembly and said rectangular anchor frame fit dimensionally inside said rectangular crate,
F) whereby said support stand assembly is operable to support said APU by said lifting points, said APU is supported by said shock isolators, and said APU fits inside said rectangular crate.

2. The shipping and storage stand according to claim 1, wherein said APU is surrounded with a moisture and dust proof bag.

3. The shipping and storage stand according to claim 2, wherein said moisture and dust proof bag additionally surrounds said cradle base frame.

4. The shipping and storage stand according to claim 1, wherein each said shock isolator is connected to said rectangular anchor frame by a pair of flanges.

5. A method preparing an airplane auxiliary power unit (APU) having an aft lifting point and a plurality of forward lifting points for storage or shipment comprising:
A) preparing:
a) a support stand assembly comprising:
i) a rectangular shaped cradle base frame,
ii) three lifting point assemblies connected to said cradle base frame,
i)
iii) each of said three lifting point assemblies comprising an assembly selection from the group consisting of:
I) a yoke assembly, said yoke assembly further comprising:
a horizontal member connected to two vertical members,
said vertical members connected to said cradle base frame,
attaching hardware connected to said horizontal member, and
said attaching hardware positioned and configured to connect to one of said lifting points, and
II) a horizontal support assembly, said horizontal support further comprising:
a vertical structural support attached to said cradle base frame,
a shaft clamp attached to said vertical structural support,
a sliding shaft positioned inside said shaft clamp,
attaching hardware connected to an end of said sliding shaft,
at least one locking bolt configured and positioned on said shaft clamp to prevent movement of said sliding shaft, and
said attaching hardware positioned and configured to connect to one of said lifting points,
b) a rectangular anchor frame connected to said cradle base frame by a plurality of shock isolators,
c) said rectangular anchor frame having a plurality of anchor plates,
d) a rectangular crate, said anchor plates positioned to connect to said rectangular crate,
e) said support stand assembly and said rectangular anchor frame fit dimensionally inside said rectangular crate,
B) connecting said APU to said support stand assembly at said plurality of lifting points,
C) positioning said APU connected to said support stand assembly inside said rectangular crate,
D) closing said rectangular crate with said APU connected to said support stand assembly positioned therein,
E) whereby said support stand assembly holds said APU by said three lifting points, said APU is supported by shock isolators, and said APU is prepared for shipping.

6. The method according to claim 5, wherein said APU is surrounded with a moisture and dust proof bag.

7. The method according to claim 6, wherein said moisture and dust proof bag additionally surrounds said cradle base frame.

8. The method according to claim 5, wherein each said shock isolator is connected to said rectangular anchor frame by a pair of flanges.

\* \* \* \* \*